July 21, 1925.

B. A. MALKIN 1,546,394

ROLL FOR PAPER AND SIMILAR MACHINES

Filed Nov. 16, 1923

INVENTOR
BERNARD A. MALKIN
By Fetherstonhaugh & Co
ATTORNEYS

Patented July 21, 1925.

1,546,394

UNITED STATES PATENT OFFICE.

BERNARD A. MALKIN, OF LACHINE, QUEBEC, CANADA.

ROLL FOR PAPER AND SIMILAR MACHINES.

Application filed November 16, 1923. Serial No. 675,240.

*To all whom it may concern:*

Be it known that I, BERNARD A. MALKIN, a subject of the King of Great Britain, and resident of the city of Lachine, in the Province of Quebec and Dominion of Canada, have invented certain new and useful Improvements in Rolls for Paper and Similar Machines, of which the following is a full, clear, and exact description.

This invention relates to new and useful improvements in carrying rolls for paper machines or the like and the object of the invention is to provide a simple and adjustable bearing for the rolls which will be contained within the end of the roll and which will be protected from any foreign matter such as dirt, water, ground pulp or the like which would interfere with the smooth working of the bearings.

Another object is to provide a roller which will be supported at both ends in bearings forming lubricant reservoirs.

A further object is to provide a roll which will be easily dismantled from its supports for changing wires, felts and the like.

In my invention I provide a roll supported on non-rotatable shafts situated at each end of the roll and adapted to extend a short distance into the roll. Between the shaft and the interior or recrossed portion of the roll, ball, roller, taper roller or such like bearings are mounted, said roll being adapted to rotate on the bearings. When tapered roller bearings are used provision is made on the shaft to limit movement of the roll in the longitudinal direction. Also, when the roll is used for carrying wet pulp or the like, provision is made to protect the bearings from foreign matter such as pulp, water or the like.

Figures 1, 2, 3:
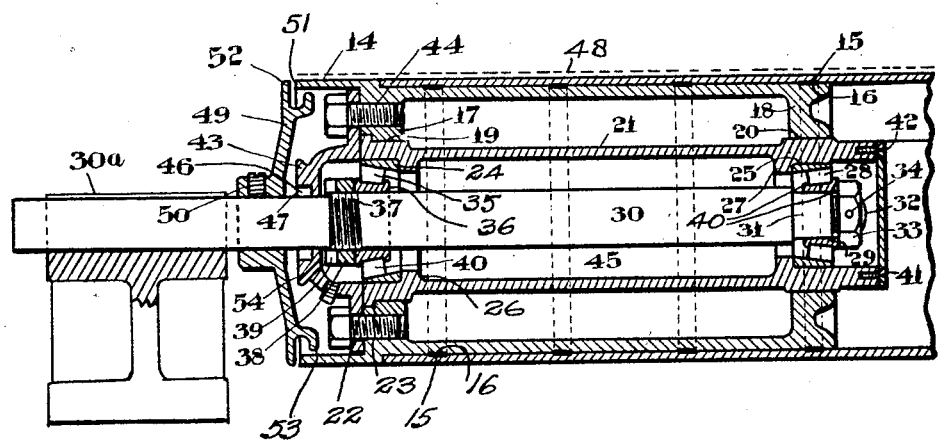
Figure 1 is a sectional elevation of one end of a roll with my preferred form of bearing.
Figure 2 is an elevation of the assembled roll.
Figure 3 is a sectional elevation of a solid roll with a modified type of bearing.

Referring more particularly to the drawings, 11 designates a tube of considerable length (which may be provided with a splice 12 at its centre 13). The tube is provided with end castings 14 which are adapted to fit and project into the end of the tubes a short distance, said castings being secured to the tube by any suitable means. In Figure 1 the tube and the casting are provided with a plurality of grooves designated 15 and 16 respectively which may be filled with lead to form an attaching medium between said tube and casting. The webs 17 and 18 of the casting are provided with apertures 19 and 20 respectively through which hollow sleeves 21 are placed, the sleeves being provided with ridges 22 at one end which engage with recesses 23 in the castings to position the sleeves. The ends of the sleeves are provided with roller race rings 24 and 25 which are held in position laterally by the shoulders 26 and 27 respectively formed in the sleeves. The conical rollers 28 are placed between the race rings 25 and 29 mounted at one end of the shaft 30 which extends from within a short distance inside the tube beyond the end of said tube to form a journal in the bracket 30ª. The race is positioned on the reduced end 31 of the shaft which is further reduced and threaded as designated 32 to hold a nut 33 which presses against the outer face of the race 29 and is held in position by a cotter or taper pin 34 passing through said nut and shaft. The rollers 35 are placed between the race ring 24 and the race ring 36 slidably mounted on the shaft 30, part 37 of which is threaded to receive the nut 38 which is provided with slots 39 for adjusting the bearings. The race rings mounted on the shaft are provided with raised portions 40 for positioning the rollers. A cover plate 41 is fitted to the inner end of the sleeve by the screws 42 to prevent dirt from entering the bearings. A cap 43 is held in position by the screw bolts 44 which engage with threaded apertures in the castings. The hollow construction of the sleeve forms a chamber 45 around the shaft, said chamber being utilized as a holder for the lubricant for the bearings. The lubricant is kept in the bearings between the washer 41 and the cap 43 which is provided with a gasket 46 placed within a groove 47 formed in the cap. Water flowing from the conveyor wire 48 flows over the edge of the rolls into a recessed collar 49 held securely to the shaft by the screws 50, the recess 51 is formed between the lips 52 and 53, lip 52 being approximately the same diameter as the outside diameter of the tube and lip 53 being slightly smaller than the inside diameter of the tube within which it is adapted to be placed. To further protect the roller bearings, a ridge 54 is formed in the cap which will throw any water or the like clear of the bearing.

In the modification shown in Figure 3 the roll 60 is of solid construction and is provided with a stepped recess, the largest part of which is designated 61, the next largest 62 and the smallest 63. In this recess a shaft 64 is inserted and is provided with shouldered journals 65 and 66 spaced from one another. Mounted on the journal 65 is the roller bearing, which comprises an inner race ring 67 and an outer race ring 68 between which are mounted the rollers 69. The inner race ring is held against the shoulder 70 formed in the shaft by means of the nut 71 which engages with the threaded portion 72 at one end of the shaft. The outer end of the race ring 68 is adapted to engage with the walls of the recess. Also mounted on the shouldered journal 66 is the ball bearing which comprises an inner race ring 73, an outer race ring 74 between which is mounted the balls 75. The inner race ring 73 is held against the shoulder 76 by means of the nut 76ª which engages with a threaded portion 77 formed in the shaft. The outer race ring 74 is adapted to engage with the inner wall of the part 62 of the recess. To hold the race ring 74 against longitudinal movement a cap or gland 78 is attached to the roller by the set screws 79. The cap fits into the part 61 of the recess and over the shaft, the nut 76ª and the ball bearing. The face 80 of the cap engages with the outer race ring and holds same against the shoulders 81 formed between the parts 62 and 63 of the recess. Baffling grooves 82 may be formed in the cap to prevent dirt or the like from entering the bearing. The parts 62 and 63 of the recess may be filled with grease to lubricate the bearings. Slight modifications may be made in the construction without departing from the spirit of the invention.

The operation of the device is as follows: To provide a support for long lengths of tubing, small shafts are placed at each end of the tubes, tapered or conical roller bearings being provided on the shaft to allow easy rotation of the roller. The roller is mounted on the ends of the castings which are securely attached thereto and the sleeves are placed through the castings. The sleeves are provided with shoulders to position the roller bearings. The lubricant for the bearings is placed within the hollow portion of the sleeve and is confined therein by the caps at one end and the washers at the other. The bearings may be adjusted by turning the nuts 38 to prevent any side play or movement of the rollers during rotation of same. Water is prevented from entering the bearing by means of the lipped or recessed collars. The part of the shafts extending beyond the ends of the rolls may then be placed in open bearings. This construction allows the rolls to be easily dismantled for repairs, adjustment, changing felts or the like.

In the carrying roll shown in Figure 3 the roller is mounted on ball and roller bearings situated at each end and in recesses formed in the roller. The ball and roller bearings are mounted on shafts extending a short distance within the roll and at each end of the roll. The recesses are closed by means of caps which fit over the shafts and hold the ball and roller bearings in the recess which may be used as a reservoir for the lubricant for the bearings.

Having thus described my invention, what I claim is:—

1. A carrying roll comprising a roller of tubular formation, short shafts extending into the tube at each end, hollow sleeves mounted on the shaft, end castings securely attached to the end of the tube and adapted to extend a short distance within the tube, tapered roller bearings between the shaft and the sleeves, means to adjust the roller bearings to prevent longitudinal movement of the tube, means mounted on the shaft to prevent the roller bearings from dirt or the like, and double lipped deflectors securely mounted on the shaft and situated at each end of the tube to protect the bearing from water or the like, one lip of each deflector being approximately the diameter of the tube and the other lip being slightly less than the inside diameter of the tube into which it is adapted to extend and a groove formed between the lips.

2. A carrying roll comprising a roller of tubular formation, short shafts extending into the ends of the tube, hollow sleeves mounted on the shaft and at each end of the tube, tapered roller bearings between the sleeves and the shaft, end castings securely attached to the roller and mounted on the sleeves, cover plates securely attached to one end of the sleeve, caps securely attached to the outer end of the end castings, said covers and caps enclosing the tapered roller bearings and grooved deflectors securely attached to the shaft and situated at the end of the rolls to protect the bearings.

In witness whereof, I have hereunto set my hand.

BERNARD A. MALKIN.